United States Patent [19]

Smith et al.

[11] Patent Number: 4,949,310

[45] Date of Patent: Aug. 14, 1990

[54] MALTESE CROSS PROCESSOR: A HIGH SPEED COMPOUND ACOUSTIC IMAGING SYSTEM

[75] Inventors: Stephen W. Smith, Rockville, Md.; Olaf T. Von Ramm, Hillsborough, N.C.

[73] Assignee: Duke University, Durham, N.C.

[21] Appl. No.: 273,601

[22] Filed: Nov. 21, 1988

[51] Int. Cl.$^5$ .............................................. G03B 42/06
[52] U.S. Cl. ......................................... 367/7; 73/628; 128/660.01
[58] Field of Search ............... 367/7, 905; 128/460.01; 73/628

[56] References Cited

U.S. PATENT DOCUMENTS 4,694,434 9/1987 Von Ramm et al. .................... 367/7

OTHER PUBLICATIONS

"A Nonlinearly Processed Array for Enhanced Azimuthal Resolution", Donn D. Lobdell, IEEE Trans Son Ultrason SU-15, No. 4, pp. 202–208, Oct. 1968.

"Signal Processing Techniques for Improving B-Mode Echoencephalography", Smith et al., Ultrasound in Medicine, vol. 1, Plenum Press, New York, pp. 405–414, 1975.

Primary Examiner—Thomas H. Tarcza
Assistant Examiner—Daniel T. Pihulic
Attorney, Agent, or Firm—Oblon, Spivak, McClelland, Maier & Neustadt

[57] ABSTRACT

An electronic signal processing device which forms a compound image for any pulse-echo ultrasound imaging system using a two-dimensional array transducer. The processing device obtains the detected sum of a series of cross-shaped apertures within the transducer in order to form a spatial compound image with the output of each cross-shaped aperture consisting of the product of the output signals from the orthogonal arms of the cross.

12 Claims, 4 Drawing Sheets

MALTESE CROSS PROCESSOR: A HIGH SPEED COMPOUND ACOUSTIC IMAGING SYSTEM

BACKGROUND OF THE INVENTION

1. Field of the Invention:

The present invention concerns electronic signal processing and, more particularly, the field of pulse-echo ultrasound imaging systems having speckle noise interference.

2. Discussion of Background:

Medical technology is replete with applications of ultrasonic imaging and particularly in the use of pulse-echo B-mode tomography. Using this mode of ultrasonic imaging, acoustic echoes which return to a transducer are displayed as brightness levels which are proportional to the echo amplitude. Cross sectional images of the object are formed by displaying the brightness levels in proportion to the echo range and the position of the transducer.

In order to form the tomographic image, a fixed focus is formed by a plurality of piston-like piezoelectric transducers which are mechanically scanned. An alternative to this arrangement is now being used in many medical ultrasound imaging devices. This alternative relies on segmented array Ultrasonics, Academic Press: London and New York, 1977.

Another type of segmented array transducer is the sectored linear phased array consisting of a single group of transducer elements which is focused and steered over a sector angle during the transmission and reception mode by properly timing the transmission signals and the receive mode echoes. An example of the sectored linear phased array is given in the article entitled "Beam Steering with Linear Arrays" by 0. T. von Ramm and S. W. Smith, IEEE Transactions on Biomedical Engineering, BME-30, 438-458, 1983.

Pulse-echo imaging devices utilize radiation which are primarily characterized as coherent radiation. This exists despite the fact that there are significant band widths associated with the short bursts of ultrasonic energy emitted by the transducer. Because coherent radiation is used, an undesirable interference pattern or "speckle" noise occurs which is superimposed on the ultrasonic images and this "speckle" significantly degrades the image quality. As an analogy, ultrasonic speckle compares favorably with laser speckle in the sense that speckle is not present in any image which is formed by incoherent radiation. This is true whether the incoherent radiation is ultrasound or light.

The recognition and its analogy to laser speckle is described in "Speckle in Ultrasound B-mode Scans", by C. B. Burckhardt, IEEE Transactions on Sonics and Ultrasonics Volume SU-25, pages 1-6, January, 1978. Aside from discussing the existence of speckle, Burckhardt also derived the first order statistics of speckle and described how to reduce speckle contrast in an ultrasound image through the technique of spatial compounding. Accordingly, the average of N uncorrelated samples of an object volume from several independent transducer orientations in both the transmit and the receive modes reduces the contrast of the speckle noise (i.e. increases the speckle signal to noise ratio, SNR) by $N^{\frac{1}{2}}$. This technique of reducing ultrasound image speckle uses spatial compounding in which the object volume is interrogated from more than one direction producing the independent samples of each target. The various schemes have been proposed with respect to spatial compounding and nearly all of these systems incorporate linear phased array transducers producing an image of either a sector or a rectangular format. Examples of these proposed systems exist as follows:

Carpenter, D. A., Dadd, M. J., and Kossoff, G., A multimode real time scanner, Ultrasound Med. and Biol. 6, 279-284 (1980).

Berson, M., Roncin, A., and Porcelot, L., Compound scanning with an electrically steered beam, Ultrasonic Imaging 3, 303-308 (1981).

D. P. Shattuck and O. T. von Ramm, "Compound scanning with a phased array," Ultrasonic Imaging, 4, 93-107 (1982).

F. L. Thurstone, O. T. von Ramm, J. G. Abbott, H. B. Butts, and D. P. Shattuck "On Producing Compound B-scans At High Image Frame Rates" Proceedings Annual Meeting, Amer. Inst of Ultra in Med. San Diego, CA, Oct. 19-23, 1978, p.54.

D. P. Shattuck, O. T. von Ramm, M. D. Weinshenker "Increased Data Acquisition Rate Through Parallel Processing," Ultrasonic Imaging 4, 196, 1982.

O. T. von Ramm, and D. P. Shattuck, "Explososcan: A parallel Processed Phased Array Scanner," Ultrasound in Medicine and Biology, Vol 8, (Supp 1), p 202, 1982.

D. P. Shattuck, "Improved Ultrasonic Imager Utilizing Spatial Compounding and Parallel Processing," Ph.D. Dissertation, Duke University, Durhan, NC 27706, 1982.

D. P. Shattuck, M. D. Weinshenker, S. W. Smith, and O. T. von Ramm, "Explososcan: A Parallel Processing Technique for High Speed Ultrasound Imaging with Linear Phased Arrays," J. Acoust. Soc. Amer. 75, 4, 1272-1282, 1984.

Although only slight attention has been given to spatial compounding using piston transducers or annular arrays in the form of mechanically scanned circular transducers, some success has been achieved through the utilization of a mechanically steered spatial compound system using four adjacent servo controlled piston transducers as discussed by T. Matzuk and M. L. Skolnick "Real time Compound Scanner Using Four Servo Controlled Transducers" Proceedings Annual Meeting, Amer. Inst. of Ultra in Med. Montreal, Aug. 27-31, 184, 1979.

Furthermore, significant recent speckle reduction has been achieved by signal processing techniques which are similar to spatial compounding such as illustrated in FIG. 1 which shows a piston transducer 10 cut into eight pie-shaped segments. In this design, the receive mode echo signals $S_i$ from each segment is envelope detected and then summed to produce a processed signal, $X = \Sigma_{i=1}^{8} Det \lambda S_i]$, for a compound image. The Det[$S_i$]refers to the envelope detected RF signal. This is illustrated by the design of M. S. Patterson and F. S. Foster, "Improvement and quantitative assessment of B-mode images produced by an annular array/cone hybrid", Ultrasonic Imaging, 5, 195-213, 1983. A single orientation of the transmit aperture is used and the receive aperture is divided into several sub-apertures to obtain independent samples of the target. A hybrid transducer was used consisting of a spherically shaped, focused transducer combined with a concentric planar transducer disk and two aluminum mirrors. A full circular aperture was used in the transmit mode with either the spherical transducer or a planar disk. In a receive mode, the signal outputs from the eight sectors of either the spherical transducer or a planar disk were combined using multiplicative processing or summation. The techniques of the FIG. 1 illustrate, for example, "phase insensitive sector addition" when referring to the above equation with respect to the processed signal. The Det[$S_i$]represents the envelope detected RF signal. The value x is the sum of the signals for the eight sectors of the receive mode transducer.

This type of system suffered approximately a threefold loss of lateral resolution while achieving some speckle contrast reduction. A similar proposal using $X=\Sigma_{i=1}^6 \text{Det}[S_i+S_{i+2}]$ was accomplished by M. S. Patterson, "The application of axicon transducers to medical ultrasound imaging", Ph.D. Thesis, University of Toronto, 1983. A third technique involved $X=\Sigma_{i=1}^8 [S_i]^{\frac{1}{2}}$. This is referred to as the multiplicative processing. Lastly, a technique wherein $X=\{\pi_{i=1}^8 [\text{Det}(S_i)]\}^{1/8}$. This technique, which is referred to as the "phase insensitive sector multiplication", also yielded speckle reduction, at the expense however of loss in the lateral resolution. This technique is disclosed by the article of A. T. Kerr, M. S. Patterson, F. S. Foster, and J. W. Hunt, entitled "Speckle Reduction in Pulse Echo Imaging Using Phase Insensitive and Phase Sensitive Signal Processing Techniques", Ultrasonic Imaging 8, 11–28 (1986). Needless to say there have been many attempts to reduce optical speckle by reducing the coherence of laser imaging systems as detailed by T. S. McKechnie, "Speckle Reduction", in *Laser Speckle and Related Phenomena*, J. C. Dainty, ed., Springer-Verlag, N.Y., 123–170, 1975.

Aside from the systems which attempt to reduce speckle by reducing the coherence of the laser imaging system, each of the prior art signal processing techniques concerning spatial compounding with linear arrays require an evaluation of the tradeoff of increased speckle SNR versus loss of lateral resolution. For a given imaging task in the body, it must be determined whether it is better to use the full transducer aperture with optimum lateral resolution in a simple scan or to divide the aperture into N subapertures to achieve N independent samples of the speckle noise and increase the speckle SNR by $(N)^{\frac{1}{2}}$ while losing some lateral resolution. Previous investigations have not confirmed the clinical effectiveness of speckle reduction via spatial compounding, but instead have relied on various studies of phantoms to evaluate the success of previous speckle reduction techniques. These studies include such things as the point spread response of the imaging system, the ratio of mean to standard deviation, i.e. the signal to noise ratio of the speckle probability density function, the cross-correlation coefficients between samples of the target volume and measurements of the detectability of lesions in tissue mimicking materials such as contrast detail diagrams and the area-wide signal to noise ratio or the contrast to speckle ratio. Each of these studies have revealed that there are consistent losses of lateral resolution or image contrast as measured by the point spread response in exchange for the improvement in the speckle SNR.

As indicated previously, there is a similarity between the speckle reduction in ultrasound images and the analog with respect to speckle reduction of optical imaging systems. A method which is similar to the above-discussed methods with respect to ultrasound has been set forth with respect to optical imaging as indicated by the above-referred to article by McKechnie. In this technique, a mask whose opening is shaped like a maltese cross is superimposed on a circular lens. Utilizing FIG. 2, this technique involves adding together the output of a series of these kinds of masks on an intensity basis in order to form a compound image.

$$X=\Sigma_{i=1}^2 [\text{Ti } S_i^2+S_{i+2}+\text{Ti } S_{i+4}+S_{i+6}]$$

Although this method maintains a lateral resolution of the imaging system as determined by the main lobe beam width, there unfortunately results an increase in side lobes. Furthermore, the summation indicated above can only be achieved by sequential integration for optical systems so that the formation of the optical compound image of reduced speckle contrast is a very time consuming process.

The device of Trimmer et al. disclosed in U.S. Pat. No. 4,430,898 describes a transducer using a diamond-shaped transmit aperture and a concentric square-shaped receive mode aperture oriented at 45° angle with respect to the transmit aperture in order to achieve reduced side lobes. No attempt was made in this patent to develop a compound imaging system or to develop a receive mode multiplicative processor.

Lobdell has discussed multiplicative processing for a four element array of transducers spaced 90° apart in his article, "A nonlinearly processed array for enhanced azimathal resolution", IEEE Trans Son Ultrason 5U-15, 202–208, 1968. However, orthogonal multiplication was not involved nor was the formation of a compound image for speckle reduction.

Smith et al. have taught the technique of multiplicative processing in a sectored linear phased array to reduce phase aberrations from skull layers or fat layers in the article, "Signal processing techniques for improving B-mode echoencephalography, in Ultrasound in Medicine Vol. 1, Plenum Press, N.Y., 405–414, 1975. However, this technique did not involve orthogonal multiplication to reduce side lobes or the formation of a compound image.

SUMMARY OF THE INVENTION

It is an object of the present invention to provide an improved electronic signal processing device which forms a compound image for any pulse-echo ultrasound imaging system using a two-dimensional array transducer.

It another object of the present invention to provide a signal processing technique used to reduce speckle noise in ultrasonic images in which a cross-shaped or T-shape determines the active area of the two-dimensional transducer.

It is a further object of the present invention to provide an acoustic imaging system using a series of independent or partially overlapping cross-shaped apertures to form a spatial compound image.

It is a further object of the present invention to form an acoustic imaging system which uses a receive-mode multiplicative process between at least two orthogonal transducer apertures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
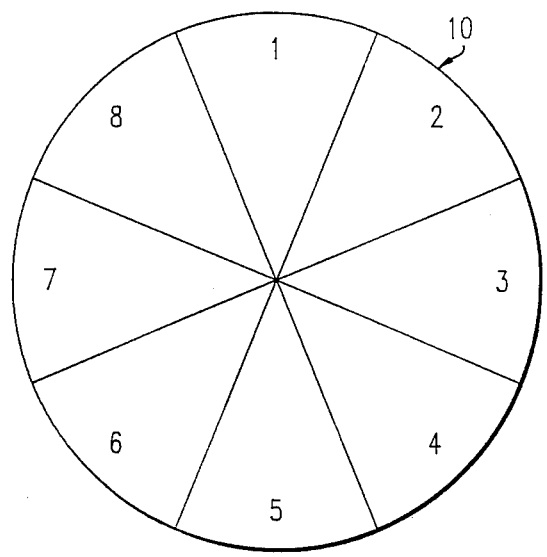
FIG. 1 illustrates a piston transducer which is segmented into eight sections.
Figure 2:
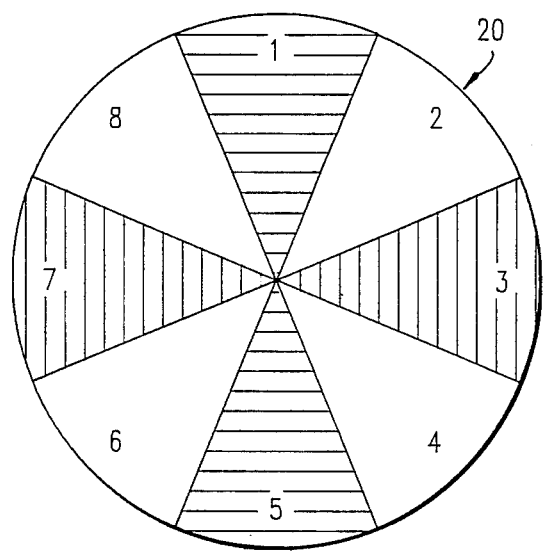
FIG. 2 illustrates a maltese cross within a circular lense/transducer arrangement according to the present invention which is derived from the segmented piston transducer of FIG. 1.
Figure 3:
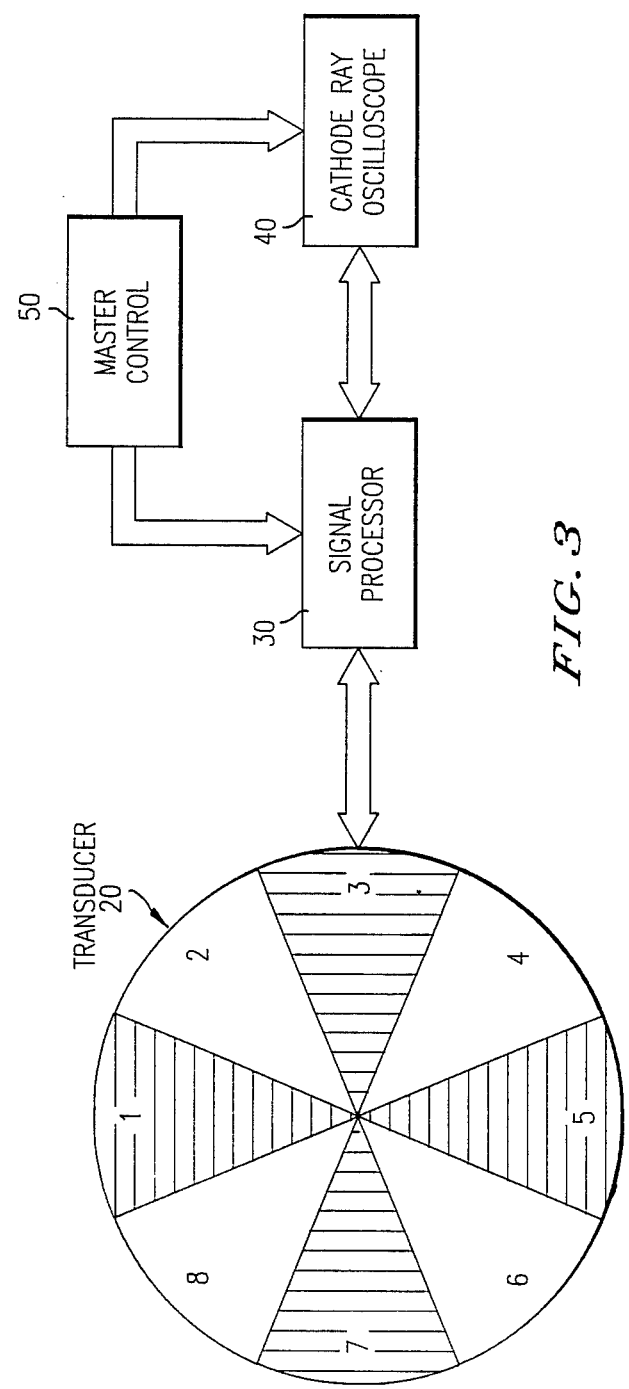
FIG. 3 is a block diagram illustrating a eight segment section focused piston transducer as a part of a acoustic-pulse echo imaging system.
Figure 4:
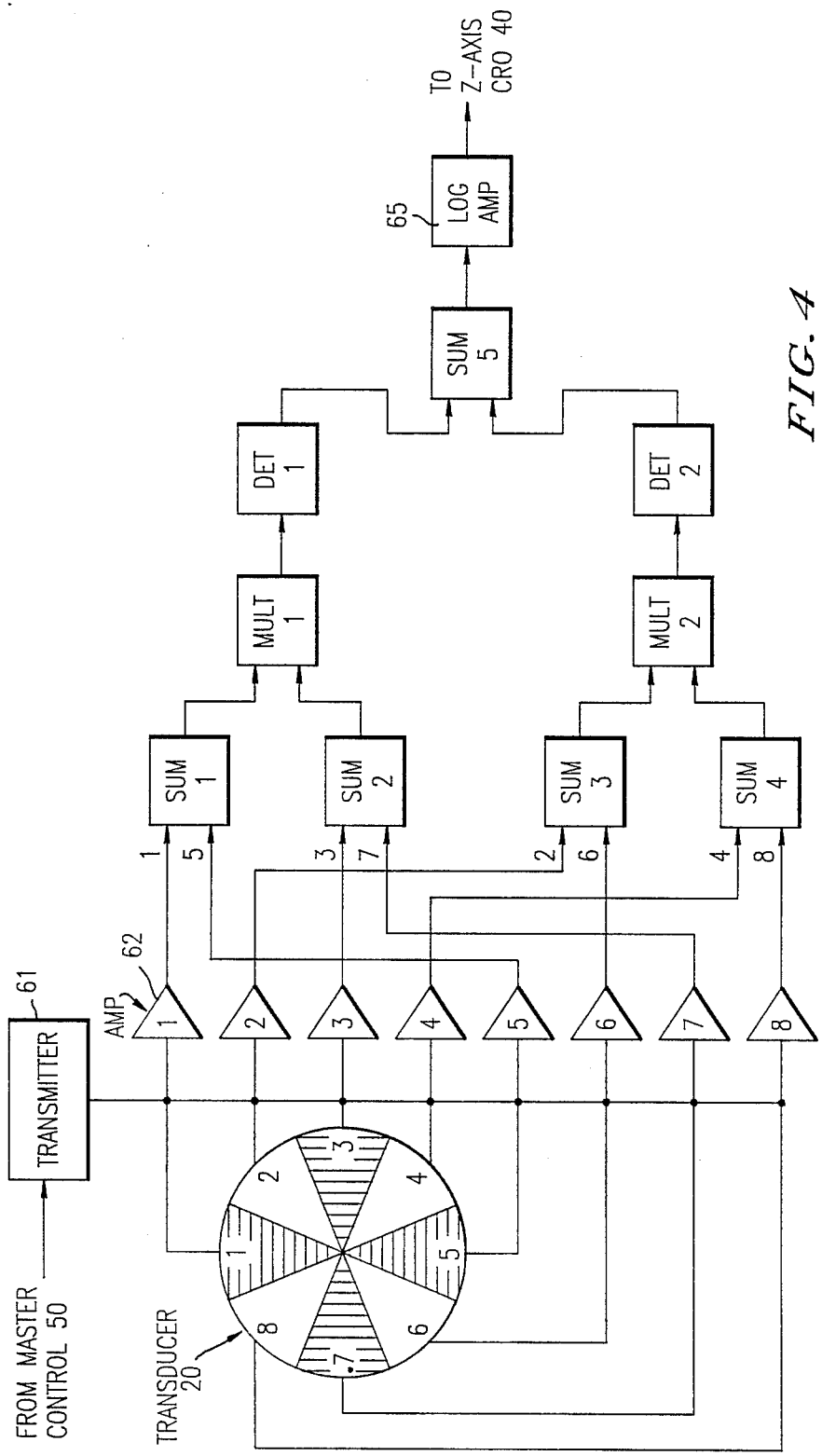
FIG. 4 illustrates the configuration for the maltese cross processor of the present invention.

Referring now to the drawings, wherein like reference numerals designate identical or corresponding parts throughout the several views, there is shown in the FIGS. 2–4 a receive mode signal processor, which utilizes a maltese cross compound system for a speckle reduction which is applicable to all pulse-echo acoustic imaging systems and which enhances lateral resolution.

The FIG. 2 illustrates the principles of the Maltese cross processor. A conventional focused piston transducer is segmented into eight equal sections. In the transmit mode, the eight sections are fired simultaneously by a single transmitter. Each sector and its opposite member, separated by 180°, is wired together at the transducer to form four "bow-tie" elements. The length of each element is equal to the transducer diameter.

The processor of FIG. 3 and the details of FIG. 4 illustrate an optimized processor according to the present invention wherein the receive mode RF signal from the horizontal bow-tie element are multiplied by the signal from the orthogonal vertical bow-tie element as indicated by the following equation:

$$X = \{\Sigma_{i=1}^{2} Det[Ti\ S_i + Ti\ S_{i+4})\cdot(S_{i+2} + 2 + S_{i+6})]\}^{\frac{1}{2}}$$

where X is the output signal from the processor. The input signals to the processor are the complex radio frequency echo signals $S_i$, $i = 1,2$.

Thus, in the system, from FIG. 2, the output from the vertical arm of the shaded cross (segments 1 and 5) is multiplied by the output of the horizontal arm of the shaded cross (segments 7 and 3). Lateral resolution is maintained since the full diameter of the aperture is used in both the horizontal and vertical directions. Side lobes are suppressed by the multiplicative aspect of the processor because two spatial response patterns are multiplied which have orthogonal orientations. The same operations are performed on the unshaded cross.

Lastly, the outputs from the two crosses undergo envelope detection (denoted as indicated previously by "Det" in the above equation) and these outputs are then added. Because the output from each cross is uncorrelated, the final output signal X shows reduced speckle contrast.

FIG. 3 shows a block diagram of a typical acoustic pulse-echo imaging system including a single focused piston transducer (sectioned into 8 segments), the Master Control unit 50, the subject Signal Processor 30, and the Cathode Ray Oscilloscope 40. The Master Control (MC) unit 50 controls the timing and the direction of the other components of the imaging system. In the case of a simple mechanically oriented B-scan device using a single piston transducer as shown, the Master Control unit contains the position information of the transducer and the echo range timing. The Master Control unit sends the information concerning the position and the timing to the X and Y inputs of the Cathode Ray Oscilloscope.

Figure 5:
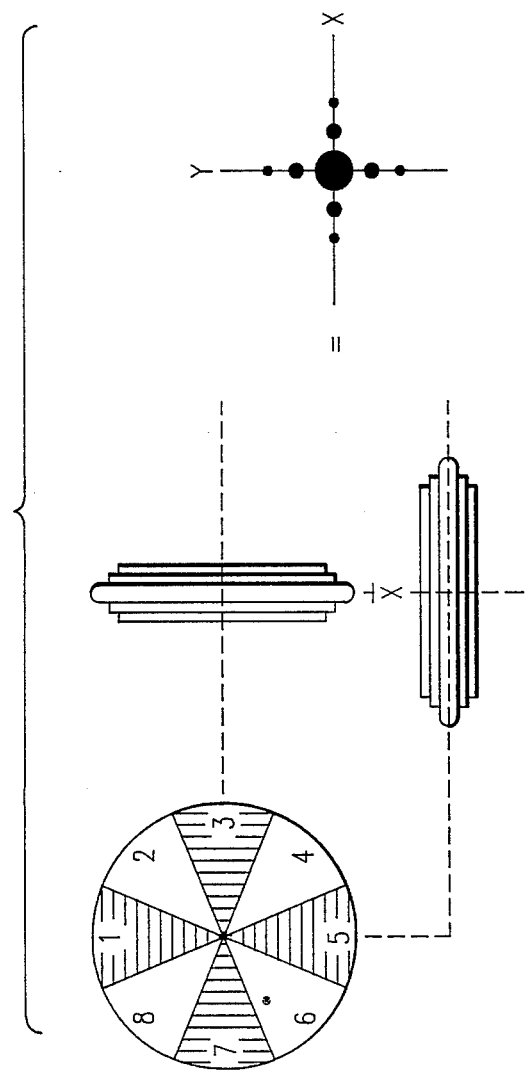
FIG. 5 illustrates a contour map of a receive mode spread function of a segmented transducer.

The results of the product are illustrated qualitatively in FIG. 5 in terms of the contour map of the receive mode point spread function. The main lobe of the receive-mode diffraction pattern $P(\gamma, \delta)$ of each bow-tie element is approximated by $$P(\gamma, \delta) \simeq \frac{\sin \alpha}{\alpha} \cdot \frac{\sin \beta}{\beta}$$

where $\alpha = \pi D \sin\gamma / \lambda$ and $\gamma$ is the angle parallel to the length of the element relative to the axis Of the transducer and where $\beta = \pi^2 D \sin\delta / 8\lambda$ and $\delta$ is the angle parallel to the element width relative to the axis of the transducer. The side lobe amplitude of the receive mode diffraction pattern is determined by the "bow-tie" apodization of each element and is significantly larger than that predicted by a sin X/X function.

The contour map of the diffraction pattern of the shaded horizontal element is shown narrow in the x direction with two side lobes and broad in the y direction. Conversely, the diffraction response of the shaded vertical element is narrow in the y direction with two side lobes and broad in the x direction. The receive mode product of these two orthogonal diffraction patterns is strongly peaked at the origin with side lobe contributions only on the x and y axes. The same product is performed in parallel for each orthogonal pair of the four elements resulting in RF signals from two Maltese crosses.

The side lobes for each cross occur at different angles without significant overlap. Because of the summation which is performed subsequent to the product, and because of the lack of overlapping side lobes, the main lobe amplitude relative to the side lobe amplitude is increased by approximately a factor of 2 compared to that of a single cross. The resulting overall receive mode response pattern is circularly symmetric with minimal side lobe contributions. The overall transmit-receive point response is further improved by the Airy disk pattern of the full circular transmit aperture.

The operation of the signal processor of this embodiment will now be described in detail. The transmitter receives trigger signals from the MC 50 and then transmit pulses are sent to the eight segments of the transducer 20 in parallel so that the transducer transmits as a single focused piston. Receive mode echoes return to the eight segments of the transducer and pass in parallel to the eight amplifiers 62. Signals from elements 1 and 5 are added in Summer No. 1; signals 3 and 7 are added in Summer No. 2; signals 2 and 6 are added in Summer No. 3; signals 4 and 8 are added in Summer No. 4. The outputs of Summers Nos. 1 and 2 are multiplied in Multiplier No. 1; the outputs from Summers Nos. 3 and 4 are multiplied in Multiplier No. 2. The output of Multipliers Nos. 1 and 2 undergo conventional envelope detection in Detectors Nos. 1 and 2 respectively. The output of Detectors Nos. 1 and 2 are added together in Summer No. 5. The output of Summer No. 5 is sent to a logarithmic amplifier 65 which performs a square root operation to restore the echo signal dynamic range which has been expanded by the multiplicative process.

The output of the log-amp is sent to the Z-axis of the oscilloscope 40.

Several variations of this maltese cross processor are easily constructed. The processor may be extended to piston transducers or two dimensional N×M phased arrays of any number of segments and hence any number of parallel channels. For the case of an N segment piston transducer, the processor yields $$X = \{\Sigma_{i=1}^{N/4} Det[(S_i + S_{i+N/2}) \cdot (S_{i+N/4} + S_{i+3N/4})]\}^{\frac{1}{2}}$$

In all instances, the square root in the equation could be displayed to restore the original signal dynamic range. Additionally, the transducer and processor can be easily designed so that partially overlapping cross transducer apertures can be used. The processor may be easily extended to a conventional annular array imaging device or any linear phased array device which uses a two-dimensional transducer array.

In that instance, delay lines would be included in the Signal Processor 30 and delay line timing signals would originate in the Master Control 50. Additionally, the system could include a scan converter rather than direct display. Of six Maltese crosses which have been constructed and tested in a focused piston transducer, the speckle contrast reduction was approximately $(4)^{\frac{1}{2}}$ or 2.0 and the image lateral resolution showed a slight improvement relative to a control case which utilized prior art methods.

Another variation of the processor which is similar to the optical maltese cross processor is $$X = \Sigma_{i+1}^{N/4} Det[S_i + S_{i+N/4} + S_{i+N/2} + S_{i+3N/4}]$$

This type of processor is achieved by removing the multipliers, however, the processor differs from the optical case in that the envelope detected signal is used rather than intensity. More importantly, this processor is carried out on line in real time by means of the receive mode parallel processing as opposed to the time consuming operation of the optical processor of the prior art.

An additional variation of the processor is achieved by forming the Maltese cross through a transmit-receive combination e.g., transmitting on segments 1 and 5 while using the receive mode signal $$X = Det[S_2 + S_6] + Det[S_3 + S_7] + Det[S_4 + S_8].$$

Still another variation is:

$$X = \{\Sigma_{i=1}^{N/4} [Det(S_i + S_{i+N/2}) \cdot Det(S_{i+N/4} + S_{i+3N/4})]\}^{1/8}$$

The Maltese cross signal processor described above and implemented according to that description increases speckle SNR while maintaining lateral resolution for mechanically scanned circular transducers.

What is claimed as new and desired to be secured by Letters Patent of the United States is:

1. An electronic signal processing device for forming a compound image of a pulse-echo ultrasound imaging system wherein said ultrasound imaging system includes a two-dimensional array transducer and wherein said transducer comprises a plurality of cross-shaped apertures with each cross-shaped aperture having two orthogonal arms and with said transducer having a plurality of rectangular or pie-shaped segments, said processor further including a means for detecting the output of each of said cross-shaped apertures and a compound images means which receives the output of said means for detecting and which outputs a combined signal which forms said compound image, wherein said output of each of said cross-shaped apertures is provided by forming the product of the output signal from the orthogonal arms of said cross-shaped apertures.

2. A device according to claim 1, wherein said two-dimensional array transducer is a focused piston transducer.

3. The device according to claim 1, wherein said means for forming said compound image has its output fed to a display means.

4. The device according to claim 1, wherein said device forms said compound image at high speeds by using receive mode parallel processing.

5. An acoustic imaging system comprising:
    a two-dimensional transducer producing a series of independent or partially overlapping cross-shaped apertures with each cross-shaped aperture having two orthogonal arms;
    means for receiving output signals from said cross-shaped apertures combined to form a compound image, wherein the output of each of said cross-shaped apertures consist of the product of the output signals from said two orthogonal arms of each of said cross-shaped apertures of said transducer.

6. The system according to claim 5, further comprising receive mode parallel processing which is used to form said compound image at high speeds.

7. The system according to claim 5, wherein said two-dimensional transducer is a focused piston transducer cut into rectangular or pie-shaped segments.

8. A method of producing a compound image of a pulse-echo ultrasound image comprising the steps of:
    providing a two-dimensional array transducer having a plurality of rectangular or cross-shaped apertures with each cross-shaped aperture having two orthogonal arms;
    processing by combining the outputs of said cross-shaped apertures in order to form a compound image, wherein said step of processing includes a step of forming a product of the output signals from each of a plurality of sets of orthogonal arms of the cross-shaped apertures.

9. The method according to claim 8, wherein said step of processing includes the step of receive mode parallel processing in order to form said compound image at high speeds.

10. An acoustic imaging system comprising:
    a two-dimensional transducer having at least two orthogonal transducer apertures;
    means for receiving and multiplying together the output of each of said at least two orthogonal tranducer apertures in order to output a compound image.

11. The system according to claim 10, wherein said transducer is a focused piston transducer which is cut into rectangular or pie-shaped segments and wherein said transducer produces a plurality of cross-shaped apertures.

12. The system according to claim 10, wherein said multiplying means includes a receive mode parallel processing means.

* * * * *